United States Patent
Yeon et al.

(10) Patent No.: US 9,954,392 B2
(45) Date of Patent: Apr. 24, 2018

(54) ENERGY STORAGE SYSTEM (ESS) USING UNINTERRUPTIBLE POWER SUPPLY (UPS)

(71) Applicant: LG CNS CO., LTD., Seoul (KR)

(72) Inventors: In Chol Yeon, Seoul (KR); Bon Jun Koo, Seoul (KR); Kwan Bok Lee, Seoul (KR); Kwang Ho Lee, Seoul (KR); Eun Ki Jeong, Seoul (KR); Chung Hyun Jung, Seoul (KR)

(73) Assignee: LG CNS CO., LTD., Seoul (KR)

( * ) Notice: Subject to any disclaimer, the term of this patent is extended or adjusted under 35 U.S.C. 154(b) by 709 days.

(21) Appl. No.: 14/502,583

(22) Filed: Sep. 30, 2014

(65) Prior Publication Data
US 2015/0171666 A1    Jun. 18, 2015

(30) Foreign Application Priority Data

Dec. 13, 2013  (KR) .......................... 10-2013-0155668

(51) Int. Cl.
*H02J 9/04*   (2006.01)
*H02J 9/06*   (2006.01)

(52) U.S. Cl.
CPC ................ *H02J 9/061* (2013.01); *H02J 9/04* (2013.01); *Y10T 307/625* (2015.04)

(58) Field of Classification Search
CPC ...... H02J 9/04; H02J 9/06; H02J 9/061; H02J 9/068; Y10T 307/625
USPC ........................................................... 700/297
See application file for complete search history.

(56) References Cited

U.S. PATENT DOCUMENTS

| | | | | |
|---|---|---|---|---|
| 3,614,479 A | * | 10/1971 | Nelson ..................... | H03K 5/08 323/277 |
| 4,695,917 A | * | 9/1987 | Jackson ................. | H02H 9/021 323/249 |
| 5,500,561 A | * | 3/1996 | Wilhelm ................... | H02J 1/06 307/48 |
| 5,797,470 A | * | 8/1998 | Bohnert .................... | G07F 5/18 186/53 |
| 6,933,627 B2 | * | 8/2005 | Wilhelm ................... | H02J 1/06 307/66 |

(Continued)

FOREIGN PATENT DOCUMENTS

| | | |
|---|---|---|
| CN | 103368241 | 10/2013 |
| JP | 2000-037044 | 2/2000 |

(Continued)

OTHER PUBLICATIONS

Korean Intellectual Property Office Application Serial No. 10-2013-0155668, Office Action dated Nov. 18, 2014, 6 pages.
Japan Patent Office Application Serial No. 2014-247746, Office Action dated Sep. 15, 2015, 3 pages.
State Intellectual Property Office of the People's Republic of China Application Serial No. 201410742089.9, Office Action dated Jul. 5, 2016, 11 pages.

*Primary Examiner* — Jason D Mitchell
(74) *Attorney, Agent, or Firm* — Lee, Hong, Degerman, Kang & Waimey

(57) ABSTRACT

An energy storage system that includes an uninterruptible power supply configured to supply first power to a load and a battery array comprising a backup battery unit. The system further includes a controller to cut off the first power supplied by the uninterruptible power supply at a first time and control the uninterruptible power supply and the battery array to supply second power to the load using power stored in the battery array. Typically, the second power is supplied when the first power is cut off.

19 Claims, 6 Drawing Sheets

(56) References Cited

U.S. PATENT DOCUMENTS

| | | | | |
|---|---|---|---|---|
| 8,193,662 B1* | 6/2012 | Carlson | ............... | H02J 9/061 307/23 |
| 2006/0006739 A1* | 1/2006 | Gonzales | ............... | G06F 1/30 307/66 |
| 2008/0203820 A1* | 8/2008 | Kramer | ............... | H02J 3/38 307/64 |
| 2010/0060244 A1* | 3/2010 | Kurokawa | ............... | H02J 7/0029 320/166 |
| 2012/0016528 A1* | 1/2012 | Raman | ............... | G06F 9/5094 700/291 |
| 2013/0043730 A1* | 2/2013 | Claise | ............... | G06F 1/263 307/66 |
| 2013/0264865 A1* | 10/2013 | Sugeno | ............... | H02J 5/00 307/9.1 |
| 2013/0274938 A1* | 10/2013 | Ahn | ............... | H04L 12/12 700/291 |
| 2014/0094979 A1* | 4/2014 | Mansfield | ............... | H02J 3/383 700/291 |

FOREIGN PATENT DOCUMENTS

| | | |
|---|---|---|
| JP | 2008-154344 | 7/2008 |
| JP | 2010-124557 | 6/2010 |
| JP | 2013-233070 | 11/2013 |
| KR | 10-2008-0033905 | 4/2008 |
| KR | 10-1215396 | 12/2012 |
| KR | 10-1331183 | 11/2013 |

* cited by examiner

ENERGY STORAGE SYSTEM (ESS) USING UNINTERRUPTIBLE POWER SUPPLY (UPS)

CROSS-REFERENCE TO RELATED APPLICATIONS

Pursuant to 35 U.S.C. § 119(a), this application claims the benefit of earlier filing date and right of priority to Korean Patent Application No. 10-2013-0155668, filed on Dec. 13, 2013, the contents of which are all hereby incorporated by reference herein in their entirety.

BACKGROUND

1. Field of the Invention

Embodiments of the present invention relate to an energy storage system (ESS) using an uninterruptible power supply (UPS).

2. Description of the Related Art

An energy storage system (ESS) according to the related art includes a battery for the ESS and a power conditioning system (PCS), and connects to a high voltage, for example, 22.9 kV power line supplied from a grid. Here, a vacuum circuit breaker (VCB), a transformer (TR), and an air circuit breaker (ACB) are to be installed for high voltage connection.

Although a high voltage connector band having a required capacity is already provided when configuring a load of a building or factory, additional power equipment needs to be installed to connect the VCR, the transformer, and the ACB to the PCS. In addition, the ESS is not considered at a stage of designing the construction of a building and thus, it is difficult to verify the effect of the high voltage connector band with respect to the entire power system.

In particular, voltage distortion may occur when driving the power equipment, for example, the PCS of the ESS. In addition, a voltage may irregularly vary during a voltage stabilization period required when the PCS starts to supply power and suspends the power supply.

SUMMARY

An aspect of the present invention provides an energy storage system that may be constructed using an existing uninterruptible power supply, thereby minimizing installation of additional equipment required to construct the energy storage system.

According to an aspect of the present invention, there is provided an energy storage system, including an uninterruptible power supply configured to supply power, a battery array including at least one backup battery unit, and a controller configured to cut off the power supplied from the uninterruptible power supply in a first power time, and to control the uninterruptible power supply and the battery array to use power stored in the battery array.

The first power time may be a power peak time at which a maximum amount of power is used, and the controller may charge the battery array through the uninterruptible power supply in second power times excluding the first power time.

The controller may include a power controller configured to supply, to the uninterruptible power supply, power applied from a grid, and a communication and sensing controller configured to communicate with an energy management system and the uninterruptible power supply, and to measure a voltage of the battery array in real time.

The power controller may cut off the power supplied from the uninterruptible power supply in the first power time and may control the uninterruptible power supply to use the power stored in the battery array, in response to an instruction of the energy management system.

The power controller may connect the power applied from the grid to a bypass port connected to the uninterruptible power supply, and may concurrently connect the applied power to an alternating current (AC)-in port corresponding to an input port through a power switch.

The power controller may include a power switch configured to cut off or supply AC power applied from the grid, a power supply configured to be supplied with power from a bypass port connected to the uninterruptible power supply and an AC-out port corresponding to an output port, and a processor configured to collect information about the interruptible power supply and the battery array, and to control charging and discharging of the uninterruptible power supply and the battery array by controlling the power switch based on the collected information.

The processor may control the power switch to cut off or connect the AC power applied from the grid, at a point in time at which the voltage reaches "0", based on a result of a measured phase of a voltage waveform of the applied AC power.

The controller may operate in any one of a charging mode in which the battery array is charged, a non-charging mode in which the battery array is not charged, a battery use mode in which the power stored in the battery array is used, or a fault and repair mode in which the power of the uninterruptible power supply is used in response to an occurrence of a fault in the battery array.

When the controller operates in the battery use mode, the controller may open a power switch, and may control the uninterruptible power supply to use the power stored in the battery array, instead of using power applied from a grid.

The controller may measure a voltage of the battery array, and may adjust a discharge quantity of the battery array based on the measurement result, in order to prevent the battery array from discharging to be less than or equal to a predetermined amount of power.

When the controller operates in the charging mode, the controller may close a power switch, and may charge a converter of the uninterruptible power supply and the battery array with power applied from a grid.

Power corresponding to 110 percent of rated capacity may be supplied to the converter of the uninterruptible power supply.

The energy storage system may further include a charge and discharge switch configured to cut off the applying of power to the battery array. When the controller operates in the non-charging mode, the controller may control the charge and discharge switch to disallow charging of the battery array and to allow discharging of the battery array.

The energy storage system may further include a charge and discharge switch configured to cut off applying of power to the battery array. When the controller operates in the fault and repair mode, the controller may open the charge and discharge switch, and may supply the power through the uninterruptible power supply.

The communication and sensing controller may include a phase detector configured to detect a frequency and a phase of each of the grid and an AC-out port connected to the uninterruptible power supply, and a voltage measurement circuit configured to measure a voltage of each of the battery array, the grid, and the AC-out port.

The communication and sensing controller may include a communicator including at least one of a communication interface of the uninterruptible power supply provided from an uninterruptible power supply manufacturer, a communication interface of a battery management system configured to monitor a state of the battery array and to control a switch for controlling charging and discharging of the battery array, and a communication interface of the energy management system configured to provide a fee policy and information about the first power time.

The communication and sensing controller may include an emergency generator switch configured to electrically separate the grid, the uninterruptible power supply, and the battery array from one another.

The communication and sensing controller may include a user interface configured to inform a user about a flow of the power.

The at least one backup battery unit may include a lithium ion battery.

According to another aspect of the present invention, there is provided a controller of an energy storage system, to cut off power supplied from an interruptible power supply in a first power time, and to control the uninterruptible power supply and a battery array to use power stored in the battery array, and to charge the battery array through the uninterruptible power supply in second power times excluding the first power time.

According to embodiments of the present invention, it is possible to reduce costs for extending and purchasing additional power equipment required to construct an energy storage system by constructing the energy storage system using an existing uninterruptible power supply.

Also, according to embodiments of the present invention, it is possible to stably supply power to a load even in the case of an occurrence of a blackout and an emergency situation by modifying a structure of an uninterruptible power supply present in a power system equipped within a factory consuming the power, and by controlling the overall operations of the uninterruptible power supply and a battery array through a controller.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
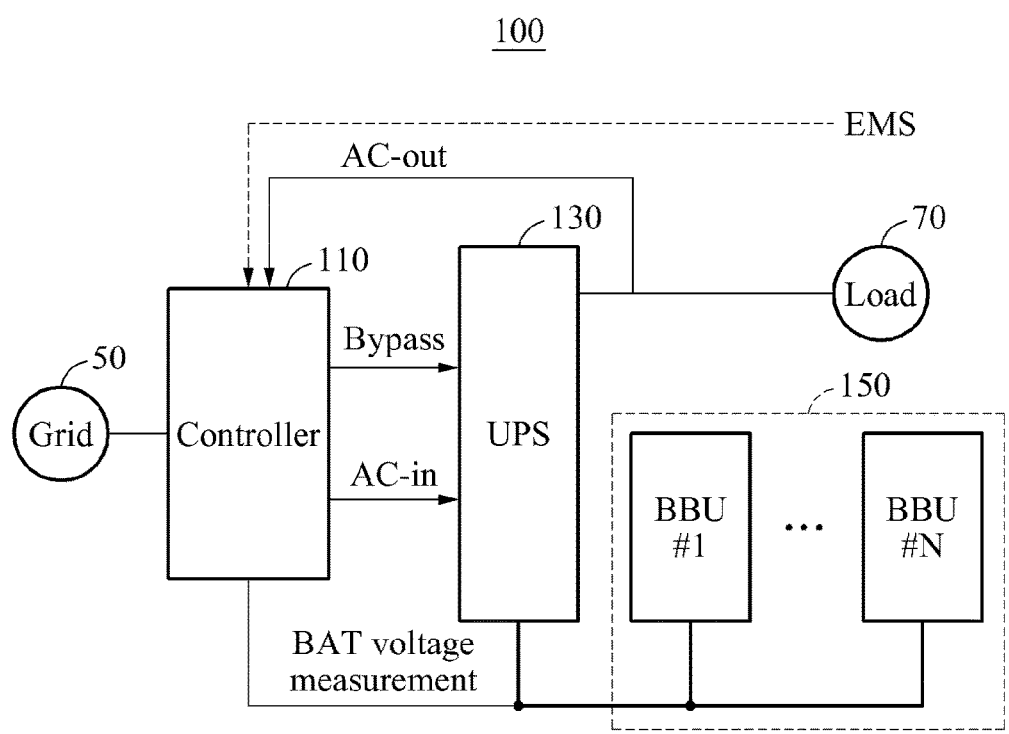
FIG. 1 illustrates an energy storage system (ESS) using an uninterruptible power supply (UPS) according to an embodiment.

Hereinafter, embodiments will be described with reference to the accompanying drawings. Like reference numerals illustrated in the drawings refer to like constituent components.

Various alterations and modifications may be made to the embodiments. The embodiments are not construed as being limited to the disclosure and should be understood to include all changes, equivalents, and replacements within the idea and the technical scope of the disclosure.

Terms used herein are for the purpose of describing particular embodiments only and are not to be limiting of the embodiments. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Like reference numerals refer to like constituent components and a repeated description related thereto will be omitted. In some cases, that which is well known will be omitted from this specification to enhance clarity.

FIG. 1 illustrates an energy storage system (ESS) using an uninterruptible power supply (UPS) according to an embodiment. In this figure, the ESS 100 may include a controller 110, the UPS 130, and a battery array 150.

The controller 110 may cut off power supplied from the UPS 130 at a first power time, for example a power peak time at which a maximum amount of power is used, and may control the UPS 130 and the battery array 150 to use power stored in the battery array 150 during this power peak time. The controller 110 may also charge the battery array 150 by supplying to the battery array 150 through the UPS 130, power applied from grid 50 at second power times, for example, times other than at the power peak time.

The controller 110 is shown disposed between a power interconnector, for example, the grid 50 and the UPS 130. The controller 110 may also be referred to as a switchable-UPS controller.

In general, the UPS 130 refers to a device that enables an important load of a user to be seamlessly used even in the case of an occurrence of a blackout, accident, or other critical event. However, in many cases, the UPS 130 may be used only in the case of an occurrence of an accident or other event that occurs a few times or tens of times per year.

According to an embodiment, an ESS may employ a power infrastructure for an existing UPS installed within a building or other location and may extend battery capacity. Accordingly, it is possible to concurrently perform the functionalities of the UPS and the ESS without causing additional costs required to construct new power equipment and an occurrence of danger.

The controller 110 may control a load using the power supplied from the UPS 130 among loads within a factory and a building to use the power stored in the battery array 150 in a power peak time.

Also, the controller 110 may directly connect the power applied from the grid 50 to a bypass port of the UPS 130, and may concurrently connect the applied power to an alternating current (AC)-in port corresponding to an input port through an internal power switch. A configuration of the controller 110 will be further described with reference to FIG. 2. In addition, the controller 110 may communicate with an energy management system (EMS), the UPS 130, and a battery management system (BMS) (not shown).

The controller 110 may measure a voltage of the battery array 150 in real time, and may provide the measurement result to the user through a user interface, or may store the measurement result in a storage device such as memory, for example.

The controller 110 may perform a mock blackout by opening or switching off the internal power switch (see 211 of FIG. 2) in response to an instruction of the EMS, and may concurrently control the power stored in the battery array 150 to be used at a load 70. When discharging of the battery array 150 is performed, the controller 110 may verify a result of performing the mock blackout by detecting voltage of the battery array 150 that decreases to be in proportion to a discharge quantity.

When closing or turning on the power switch, the controller 110 may verify an increase in a charge quantity and thereby verify that charging is being performed because the voltage of the battery array 150 increases to be in proportion to the charge quantity.

The controller 110 may operate in a variety of modes, for example, a charging mode, a non-charging mode, a battery use mode, and a fault and repair mode. Operation of an ESS 100 and a flow of power according to each operational mode will be described with reference to FIGS. 3 through 6.

Depending on embodiments, when a communication interface is provided from a UPS manufacturer, the controller 110 may use the power stored in the battery array 150 without switching on or off the internal power switch. The power switch may be controlled using an instruction through the communication interface of the UPS 130 in the case of an occurrence of an emergency situation, a malfunction, or other condition.

Referring still to FIG. 1, the UPS 130 may supply power to the load 70. The battery array 150 may include one or a plurality of backup battery units (BBUs), for example, BBU#1, . . . , BBU#N. Each of the plurality of BBUs may include lithium ion batteries.

Although not illustrated, the ESS 100 may further include a charge and discharge switch configured to apply power to the battery array 150. The charge and discharge switch may be configured to separately include a charge switch and a discharge switch, or may be configured to control charging or discharging using a single switch.

Figure 2:
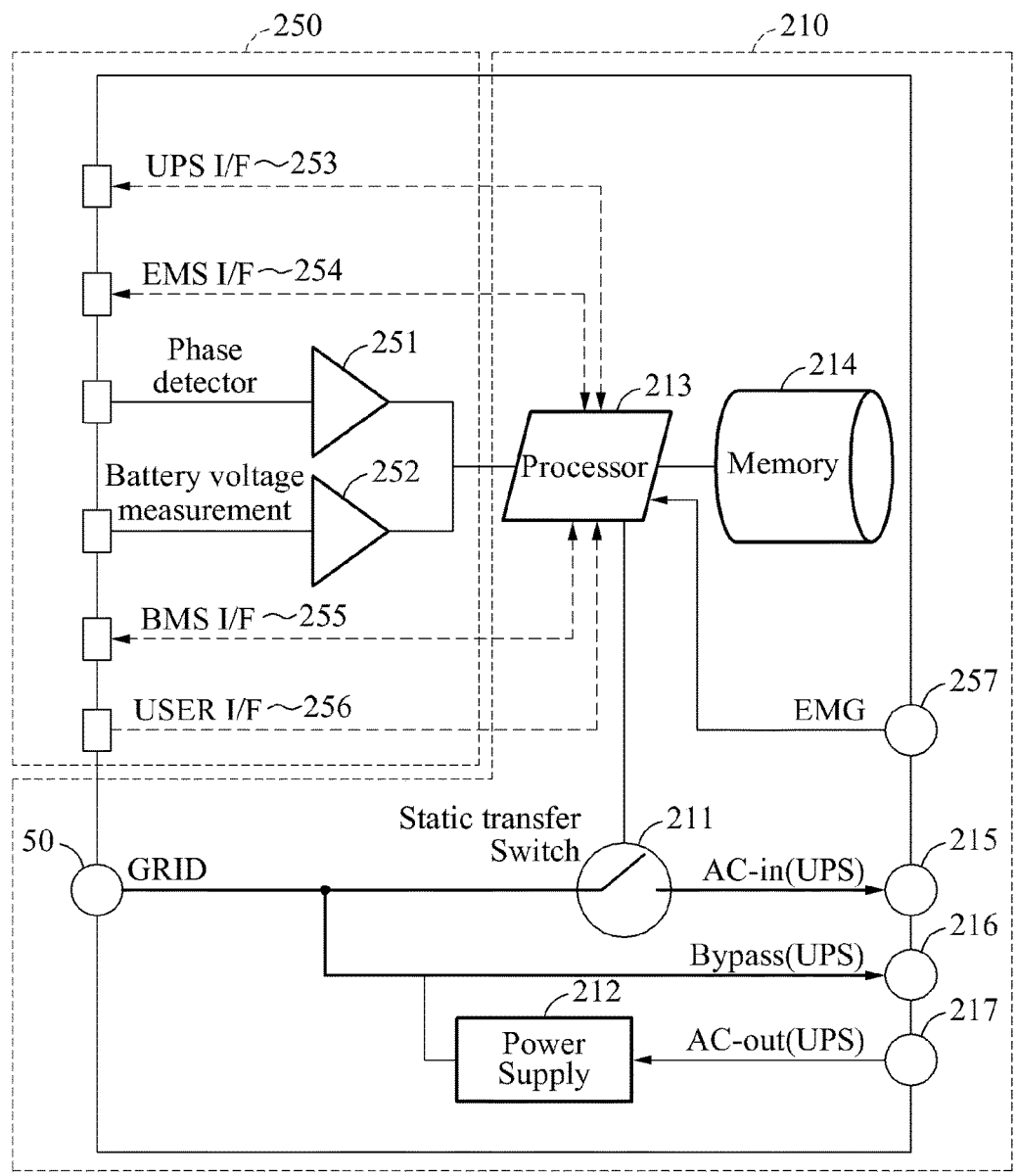
FIG. 2 illustrates a controller included in an ESS according to an embodiment.

FIG. 2 illustrates a controller included in an ESS according to an embodiment. In this figure, the controller 200 of the ESS may include a power controller 210 and a communication and sensing controller 250. Controller 200 is one example of a controller that may be implemented for controller 110 of FIG. 1. For instance, the power controller 210 may connect power applied from the grid 50 to the UPS 130 of FIG. 1. In addition, the power controller 210 may cut off power supplied from the UPS 130 at a power peak time, and may control the UPS 130 to use battery stored in the battery array 150 of FIG. 1, in response to an instruction of the EMS.

The power controller 210 may include a power switch 211, a power supply 212, and a processor 213. In addition, the power controller 210 may further include a storage device 214, for example, a memory, an AC-in port 215 corresponding to an input port, a bypass line including a bypass port 216, an AC-out port 217 corresponding to an output port, and a protection circuit (not shown).

The power switch 211 may cut off or supply AC power applied from the grid 50. The power switch 211, for example, an electronic switch device, has a very fast response speed and thus, may cut off or supply the power immediately at a point at which the voltage reaches "0". The power switch 211 may be, for example, a static transfer switch (STS).

The power supply 212 may supply power required at the power controller 210. The power supply 212 may be supplied with the power concurrently from the bypass port 216 and the AC-out port 217 that is supplied with the power from the UPS 130 and thus, may prepare for an occurrence of a blackout or other event.

Depending on the embodiment implemented, the power supply 212 may not be supplied with power from the bypass line and may instead be supplied with power only from the AC-out port 217. Also, the bypass line may be directly connected from the grid 50 to the UPS 130 without passing the controller 200.

The processor 213 may collect information about the UPS 130 and the battery array 150, and may control charge and discharge of the UPS 130 and the battery array 150 by controlling the power switch 211 based on the collected information.

The processor 213 may control the power switch 211 to cut off or connect the AC power applied from the grid 50, and this may occur at a point in time at which the voltage reaches "0", based on a result of measuring a phase of a voltage waveform of the AC power applied from the grid 50. The phase of the voltage waveform of the AP power applied from the grid 50 may be measured by a phase detector 251.

The storage device 214 may store information transferred from the processor 213.

The AC-in port 215 may be used to supply the power to the UPS 130, and the supply of power may be controlled through the power switch 211. Also, the power supplied through the AC-in port 215 may be supplied to the load 50, the UPS 130, and the battery array 150.

The bypass port 216 may include a bus bar including a upper component, and may be used to supply bypass power to the UPS 130. The power controller 210 may connect the power applied from the grid 50 to the bypass port 216 connected to the UPS 130, and concurrently, may also connect the applied power to the AC-in port 215 through the power switch 211. The communication and sensing controller 250 may communicate with the EMS and the UPS 130, and may measure a desired voltage of the battery array 150 and voltages of the plurality of BBUs included in the battery array 150.

The communication and sensing controller 250 may include the phase detector 251 and a voltage measurement circuit 252. The phase detector 251 may detect frequency and phase from each of the grid 50 and the AC-out port 217 connected to the UPS 130. The frequency and phase detected at the phase detector 251 may be transferred to the processor 213 and such information may also be stored in the storage device 214.

The voltage measurement circuit 252 may measure a voltage of each of the battery array 150, the grid 50, and the AC-out port 217 connected to the UPS 130. The measurement result of the voltage measurement circuit 252 may be transferred to the processor 213, and may also be stored in the storage device 214.

The communication and sensing controller 250 may further include a communicator (not shown). The communicator may include at least one of a communication interface 253 of the UPS 130, a communication interface 254 of the EMS, and a communication interface 255 of a BMS.

The communication interface 253 of the UPS 130 may be implemented using a communication interface provided from an UPS manufacturer, and may perform a mock blackout by predefining a command without operating the power switch 211 every time.

The communication interface 254 of the EMS may be used to receive an instruction from the EMS that collectively determines a fee policy and information about a power peak time, for example, the Korean Electric Power Corporation (KEPC)®, and to feed back information of the controller 200.

The user interface 255 of the BMS may be used to secure the stability of the ESS by monitoring a state of the battery array 150, and to control a switch, for example, a charge and discharge switch, for controlling the charging and discharging of the battery array 150. In addition, the communication and sensing controller 250 may further include a user interface 256 and an emergency generator (EMG) switch 257.

The user interface 256 may provide a graphics interface for informing the user about a current flow of power. Buttons for inputting settings required for an operation of the ESS according to an embodiment may also be provided.

The EMG switch 257 may be provided as an image button on a touch screen and may also be provided as an external physical button of the ESS based on a method of configuring a user interface. The EMG switch 257 may electrically separate the grid 50, the UPS 130, and the battery array 150 from one another by opening the power switch 211, and a charge and discharge switch (not shown) may be used in the case of an occurrence of an emergency situation.

The processor 213 may selectively and electrically separate the grid 50, the UPS 130, and the battery array 150 by selectively controlling the power switch 211 and the charge and discharge switch based on a type of the emergency situation or other condition.

An output of the EMG switch 257 may be input to the processor 213. The power switch 211 and the charge and discharge switch may be controlled based on the input value. Also, the EMG switch 257 may be configured to directly control the power switch 211 and the charge and discharge switch without using the processor 213.

Figure 3:
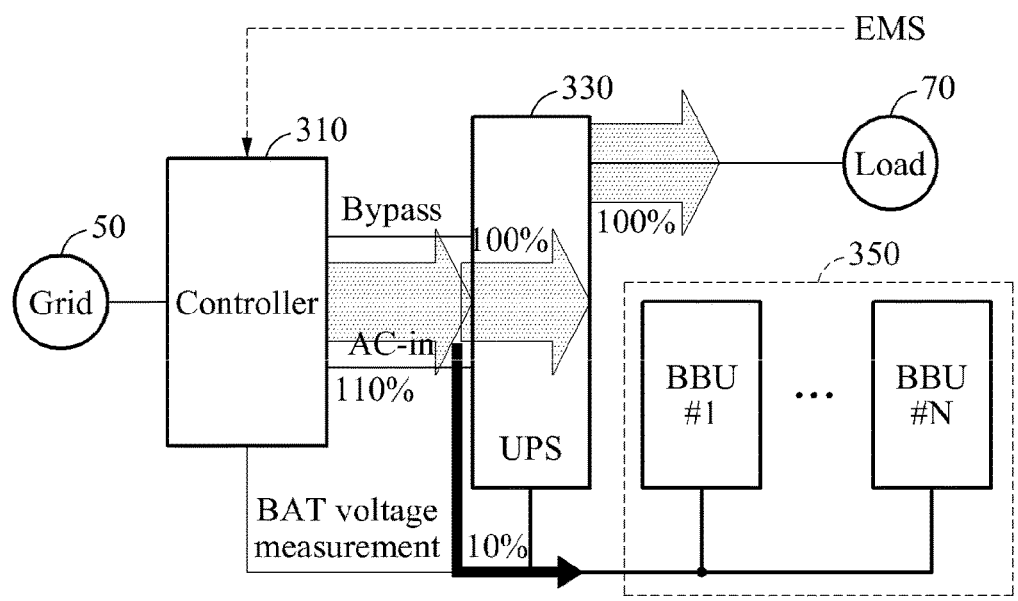
FIG. 3 is a diagram showing a flow of power when an ESS operates in a charging mode according to an embodiment.

FIG. 3 is a diagram showing a flow of power when an ESS operates in a charging mode according to an embodiment. An operation of the ESS 300 in the charging mode in which a battery array 350 is charged will be described with reference to FIG. 3. Hereinafter, the efficiency of lithium batteries included in a plurality of BBUs of the battery array 350 is assumed to be 100 percent.

When the ESS 300 operates in the charging mode, a controller 310 may close an internal power switch (see 211 of FIG. 2) and may charge a converter of a UPS 330 and the battery array 350 with power applied from the grid 50.

When the power switch is closed, the power applied from the grid 50 may be supplied to the UPS 330 through a bypass port and an AC-in port. A 110 percent, for example, of rated capacity of the AC power may be applied from the grid 50 to the converter of the UPS 330. The converter of the UPS 330 may the n convert 100 percent of the AC power among 110 percent of AC power to direct current (DC) power.

The remaining 10 percent (or a typical maximum of 15 percent) of AC power applied from the grid 50 may be used to charge the battery array 350. The controller 310 may control the UPS 330 and the battery array 350 so that the converter of the UPS 330 converts 100 percent of AC power among the 110 percent of AC power to DC power and the battery array 350 is charged with the remaining 10 percent (maximum 15 percent) of AC power.

The DC power converted by the converter of the UPS 330 may be supplied to the load 70 of such as a factory or an electronic device. The controller 310 may control the converter of the UPS 330 to charge the battery array 350 in a time zone in which power is relatively low, such as a midnight time zone.

Figure 4:
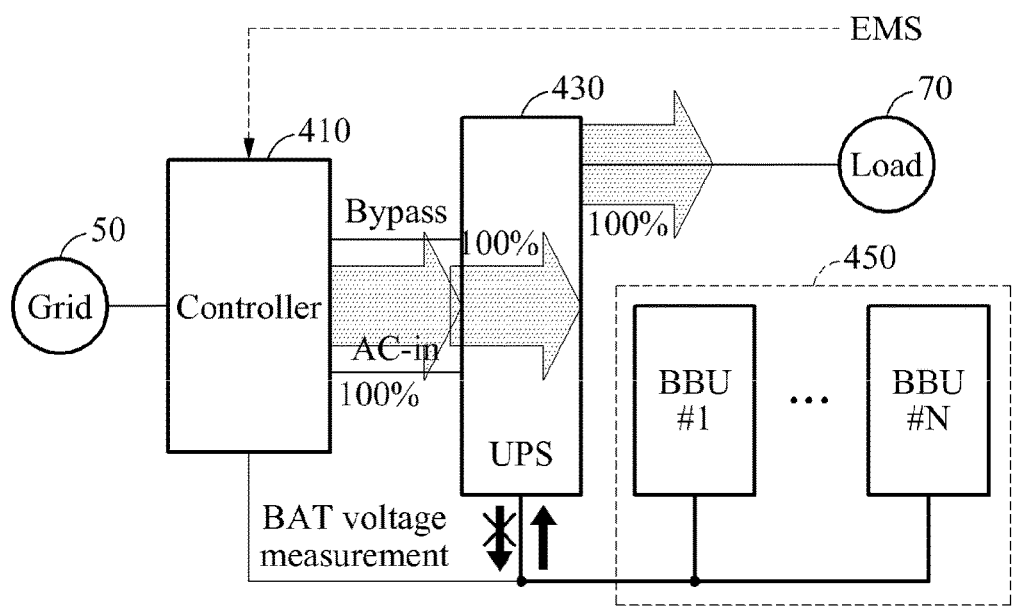
FIG. 4 is a diagram showing a flow of power when an ESS operates in a non-charging mode according to an embodiment.

FIG. 4 is a diagram showing a flow of power when an ESS operates in a non-charging mode according to an embodiment. An operation of the ESS 400 in the non-charging mode in which a battery array 450 is not charged will be described with reference to FIG. 4.

When the ESS 400 operates in the non-charging mode, a controller 410 may control a charge and discharge switch (not shown) to disallow charging of the battery array 450 and to allow charging of the battery array 450. Since charging of the battery array 450 is allowed in the non-charging mode, it is possible to prepare for a system blackout or other event.

The controller 410 may control the battery array 450 to operate in the non-charging mode in which a battery is not charged by controlling the charge and discharge switch at, for example, a power peak time. The charge and discharge switch refers to a switch capable of cutting off the applying of power to the battery array 450. When the charge and discharge switch is adjusted to be in a discharge direction, supply of power from a UPS 430 to the battery array 450 may be cut off. However, supply of power from the battery array to the UPS 430 may be allowed.

The charge and discharge switch may be configured to separately include a charge switch and a discharge switch, or may be configured to control charging or discharging using a single switch.

Figure 5:
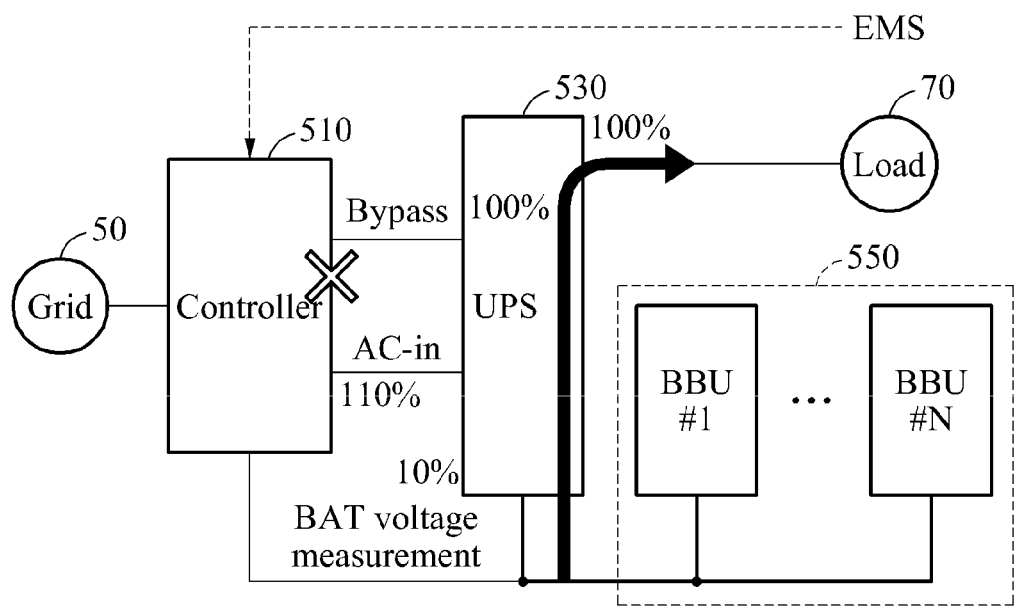
FIG. 5 is a diagram showing a flow of power when an ESS operates in a battery use mode according to an embodiment.

FIG. 5 is a diagram showing a flow of power when an ESS operates in a battery use mode according to an embodiment. An operation of the ESS 500 in the battery use mode will be described with reference to FIG. 5.

In the battery use mode, power stored in a battery array 550 is supplied to the load 70 instead of power supplied from the grid 50. When the ESS 500 operates in this battery use mode, a controller 510 may open an internal power switch and may control a UPS 530 to use the power stored in the battery array 550 instead of using the power applied from the grid 50.

The controller 510 may induce the UPS 530 to recognize a blackout situation, or other event, and discharge the battery array 550 by opening the power switch within the controller 510, for example, at a power peak time or depending on necessity.

The controller 510 may measure a voltage of the battery array 550 and may adjust a discharge quantity of the battery array 550 based on the measurement result, in order to prevent the battery array 550 from discharging to be less than or equal to a predetermined or threshold amount of power. The voltage measurement circuit 252 of FIG. 2 may be used to measure the voltage of the battery array 550.

Figure 6:
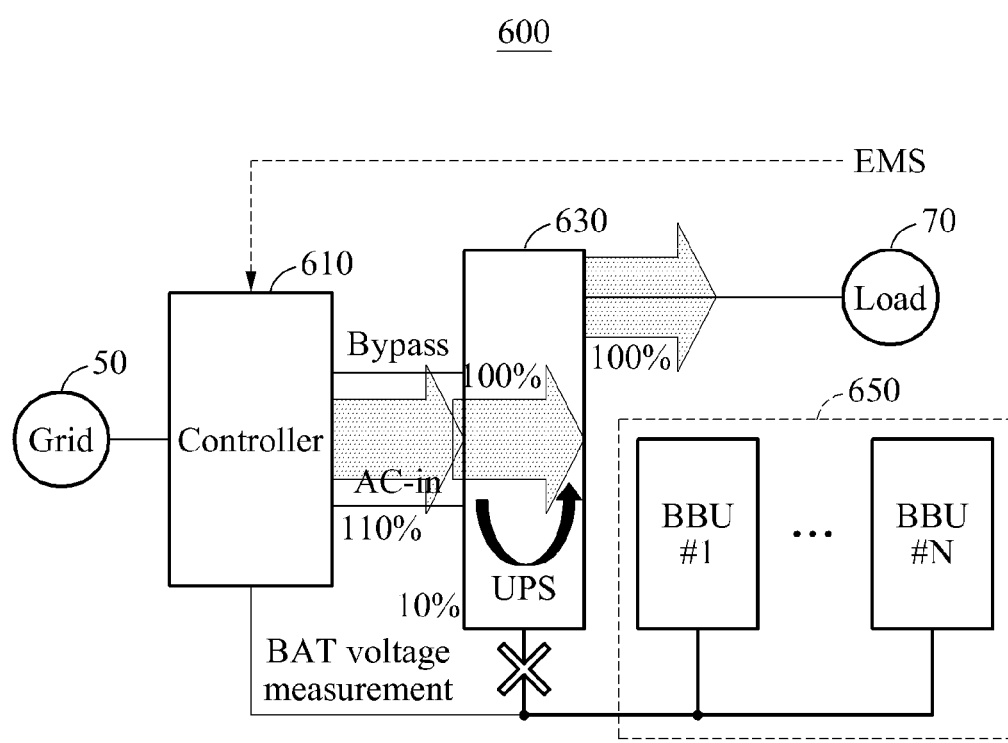
FIG. 6 is a diagram showing a flow of power when an ESS operates in a fault and repair mode according to an embodiment.

FIG. 6 is a diagram showing a flow of power when an ESS operates in a fault and repair mode according to an embodiment. An operation of the ESS 600 in the fault and repair mode will be described with reference to FIG. 6.

In response to a notification from, for example, a BMS, about a fault in the lithium ion batteries included in a battery array 650 or an impossibility to charge the lithium ion batteries through a communication interface of the BMS, a controller 610 may control the ESS 600 to operate in the fault and repair mode.

When the ESS 600 operates in this fault and repair mode, the controller 610 may open a charge and discharge switch (not shown) and may supply the power through a UPS 630. The controller 610 may electrically separate the battery array 650 from the ESS 600 by opening the charge and discharge switch.

In response to an occurrence of a fault in the battery array 650, the controller 610 may normally supply the power to the load 70 using the power of the UPS 630 instead of using the power stored in the battery array 650.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An energy storage system, comprising:
   an uninterruptable power supply configured to supply first power, received from a grid, to a load;
   a battery array comprising a backup battery unit;
   a power supply coupled to a bypass port and an output port, to concurrently receive the first power from the grid, via the bypass port, and power from the uninterruptable power supply, via the output port;
   a power switch configured to cut off or supply the first power to the uninterruptable power supply;
   a controller receiving power from the power supply, wherein the controller is configured to:
      control the power switch to, at a first time, cut off the first power supplied to the uninterruptable power supply to cut off the first power supplied by the uninterruptible power supply to the load; and
      control the uninterruptable power supply and the battery array to supply second power to the load using power stored in the battery array, wherein the second power is supplied when the first power is cut off.

2. The energy storage system of claim 1, wherein the first time is a power peak time at which a maximum amount of power is used, and the controller is further configured to charge the battery array through the uninterruptible power supply only at second time periods, which are time periods other than the first time.

3. The energy storage system of claim 1, further comprising:
   a communication and sensing controller configured to communicate with an energy management system and the uninterruptible power supply, and to measure a voltage of the battery array in real time.

4. The energy storage system of claim 3, wherein the controller is further configured to cut off the first power supplied by the uninterruptible power supply at the first time, and to control the uninterruptible power supply to supply the second power stored in the battery array at the first time, in response to an instruction from the energy management system.

5. The energy storage system of claim 3, wherein the controller is further configured to:
   collect information about the uninterruptible power supply and the battery array, and to control charging and discharging of the uninterruptible power supply and the battery array by controlling the power switch based on the collected information.

6. The energy storage system of claim 5, wherein the controller is further configured to control the power switch to cut off AC power applied from the grid, when voltage reaches "0" according to a result of measuring a phase of a voltage waveform of the applied AC power.

7. The energy storage system of claim 3, wherein the communication and sensing controller comprises:
   a phase detector configured to detect a frequency and phase of each of the grid and output port connected to the uninterruptible power supply; and
   a voltage measurement circuit configured to measure a voltage of each of the battery array, the grid, and the output port.

8. The energy storage system of claim 3, wherein the communication and sensing controller comprises:
   a communicator comprising one or more of:
   a communication interface of the uninterruptible power supply provided from an uninterruptible power supply manufacturer,
   a communication interface of a battery management system configured to monitor a state of the battery array and to control a switch for controlling charging and discharging of the battery array, or
   a communication interface of the energy management system configured to provide a fee policy and information about the first time.

9. The energy storage system of claim 3, wherein the communication and sensing controller comprises:
   an emergency generator switch configured to electrically separate the grid, the uninterruptible power supply, and the battery array from each other.

10. The energy storage system of claim 3, wherein the communication and sensing controller comprises a user interface configured to inform a user about a flow of the first power.

11. The energy storage system of claim 1, wherein the controller is further configured to operate in any one of:
   a charging mode in which the battery array is charged,
   a non-charging mode in which the battery array is not charged,
   a battery use mode in which the second power stored in the battery array is used, or a fault and repair mode in which the first power of the uninterruptible power supply is used in response to an occurrence of a fault in the battery array.

12. The energy storage system of claim 11, wherein when the controller operates in the battery use mode, the controller is further configured to open the power switch, and to control the uninterruptible power supply to use the second power stored in the battery array, instead of using power applied from the grid.

13. The energy storage system of claim 12, wherein the controller is further configured to measure a voltage of the battery array, and to adjust a discharge quantity of the battery array based on the measurement result, to prevent the battery array from discharging to be less than a threshold amount of power.

14. The energy storage system of claim 11, wherein when the controller operates in the charging mode, the controller is configured to close the power switch, and to charge a converter of the uninterruptible power supply and the battery array with power applied from the grid.

15. The energy storage system of claim 14, wherein power corresponding to 110 percent of rated capacity is supplied to the converter of the uninterruptible power supply.

16. The energy storage system of claim 11, further comprising:
 a charge and discharge switch configured to cut off applying of power to the battery array,
 wherein when the controller operates in the non-charging mode, the controller is configured to control the charge and discharge switch to disallow charging of the battery array and to allow discharging of the battery array.

17. The energy storage system of claim 11, further comprising:
 a charge and discharge switch configured to cut off applying of power to the battery array,
 wherein when the controller operates in the fault and repair mode, the controller is further configured to open the charge and discharge switch and supply the first power through the uninterruptible power supply.

18. The energy storage system of claim 1, wherein the backup battery unit comprises a lithium ion battery.

19. A controller system, comprising:
 memory;
 a first AC line configured to supply first power from an uninterruptable power supply to a load;
 a power supply coupled to a bypass port and an output port, to concurrently receive the first power from a grid, via the bypass port, and power from the uninterruptable power supply, via the output port;
 a power switch configured to cut off or supply the first power to the uninterruptable power supply;
 a processor receiving power from the power supply and operatively coupled to the memory, wherein the processor is configured to:
  control the power switch to, at a first time, cut off the first power supplied to the uninterruptable power supply to cut off the first power supplied by the uninterruptible power supply to the load;
  control the uninterruptable power supply and the battery array to supply second power to the load using power stored in the battery array, wherein the second power is supplied when the first power is cut off; and
 charge the battery array through the uninterruptible power supply at second time periods, which are time periods other than the first time.

\* \* \* \* \*